J. J. KELLY.
VEHICLE BODY.
APPLICATION FILED AUG. 8, 1921.
1,428,239.
Patented Sept. 5, 1922.
2 SHEETS—SHEET 1.
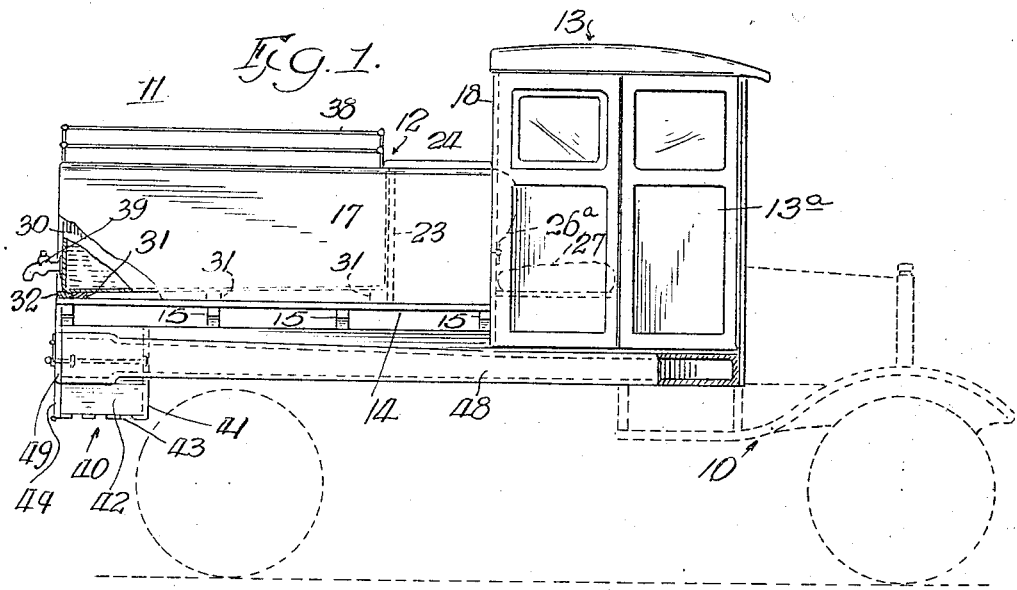
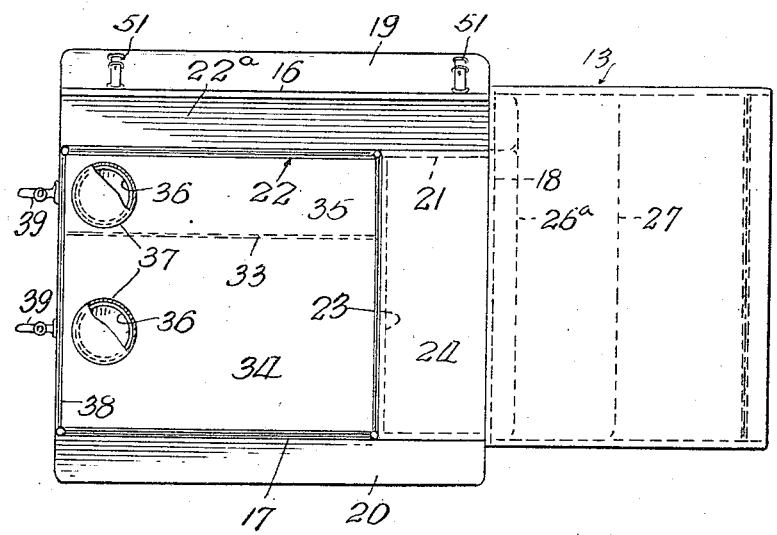

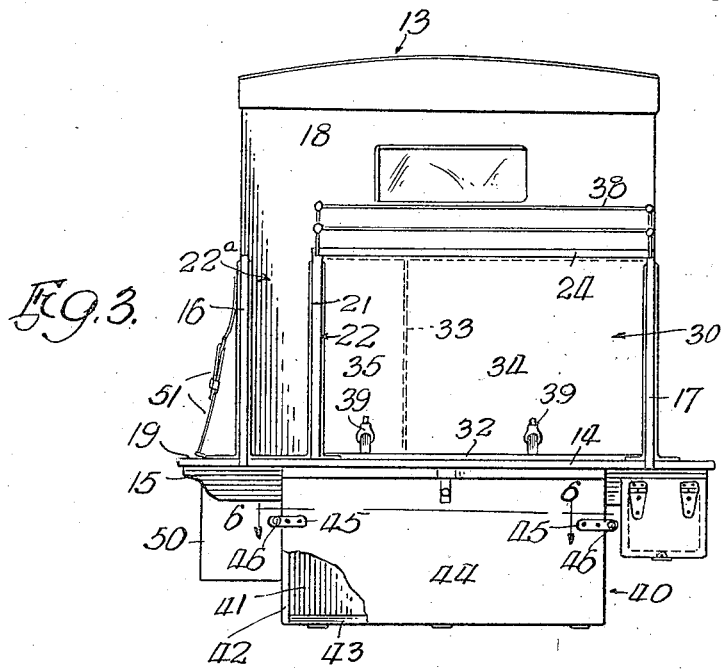
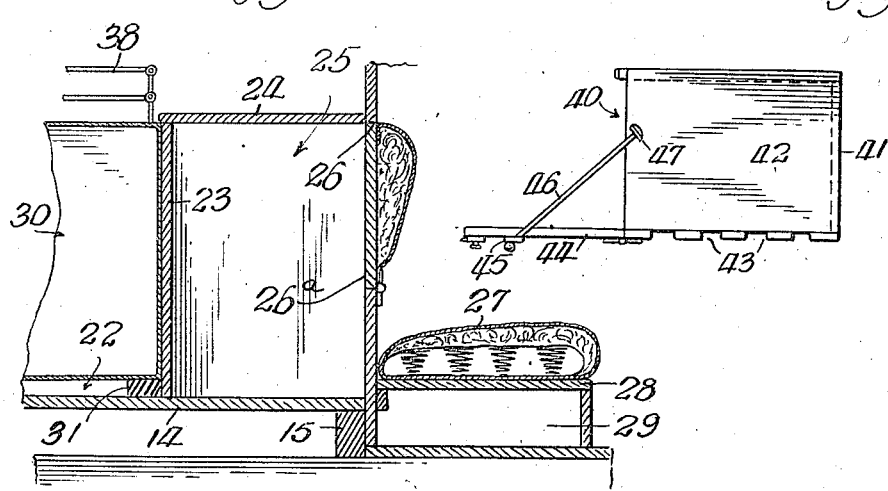
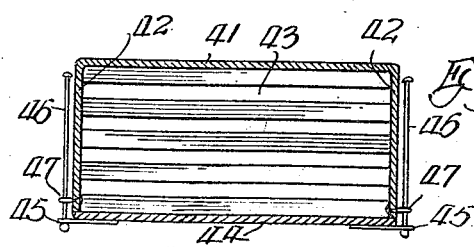

Patented Sept. 5, 1922.

1,428,239

UNITED STATES PATENT OFFICE.

JAMES J. KELLY, OF CHICAGO, ILLINOIS, ASSIGNOR TO THOS. CUSACK COMPANY, OF CHICAGO, ILLINOIS, A CORPORATION OF NEW JERSEY.

VEHICLE BODY.

Application filed August 8, 1921. Serial No. 490,547.

*To all whom it may concern:*

Be it known that I, JAMES J. KELLY, a citizen of the United States, and a resident of Chicago, county of Cook, and State of Illinois, have invented certain new and useful Improvements in Vehicle Bodies; and I do hereby declare that the following is a full, clear, and exact description thereof, reference being had to the accompanying drawings and to the letters of reference marked thereon, which form a part of this specification.

This invention relates to improvements in vehicle bodies and consists of the matters hereinafter described and more particularly pointed out in the appended claims.

One of the objects of the present invention is to provide a body for bill posters' vehicles which is so constructed as to hold the implements of the trade in an orderly manner and in an arrangement convenient to the needs of the bill posters.

A further object of the invention is to so arrange the various parts of the body as to provide an even distribution of weight upon the vehicle, and to provide a body which is compact and neat in appearance.

These objects of the invention as well as the several advantages thereof, will more fully appear as I proceed with my specification.

In the drawings:—

Fig. 1 is a view in side elevation of a vehicle body, made in accordance with my invention.

Fig. 2 is a top plan view thereof.

Fig. 3 is a rear end view thereof on an enlarged scale.

Fig. 4 is a detail vertical section through the seat end of the vehicle body.

Fig. 5 is a view in side elevation of a bucket box or compartment embodied in my improved vehicle body.

Fig. 6 is a horizontal, detail sectional view taken on the line 6—6 of Fig. 3.

Referring now in detail to that embodiment of the invention illustrated in the accompanying drawings, 10 (see Fig. 1) indicates the chassis of a motor vehicle and 11 indicates my improved body, mounted thereon. Said body includes in general a body box 12 and a driver's cab 13 at the front end thereof, said cab having the usual entrance doors 13ª. 14 indicates the floor of the body box which is secured to longitudinally spaced, transverse bolsters 15, mounted on the chassis in any convenient manner. The body box includes left and right hand, upright side boards 16 and 17 which terminate at their front ends, at the back wall 18 of the cab, there being foot boards 19 and 20 extending laterally of the side boards in the plane of the floor. 21 indicates an intermediate upright wall, parallel with the side walls and spaced preferably nearer the wall 16 than the wall 17, to define relatively wide and narrow compartments 22 and 22ª respectively. These walls are suitably braced from the floor of the body to withstand lateral pressure. The narrow compartment 22ª is adapted to receive the usual jacks, stepladders and horses so frequently used in the bill-posting trade.

Near the front end of the wider compartment 22 is a cross-board 23 which together with the rear or back wall 18 of the cab and a top board 24 provides a water-tight box or space 25 (see Fig. 4) for the reception of the bills or other display sheets or sections to be posted. In the rear wall of the cab is an opening 26 providing access to the box 25 from within the cab, this opening being normally closed by a seat-back board 26ª. The seat back board, which is upholstered upon its front side, is hinged at its bottom edge to the rear wall 18 of the cab and may be swung downwardly to rest upon the driver's seat cushion 27 and thus form a table-like support upon which the bill and poster sections may be conveniently assorted for the purpose of picking out such sections as go to make up a complete bill or poster. Any suitable means may be provided to hold the seat-back board in the upright closed position shown in Fig. 4. The seat cushion 27 is attached to a removable seat board 28 which provides the top for a tool compartment 29.

In that part of the wider compartment 22, back of the box or space 25, is located a removable rectangular tank 30. The bottom wall of this tank, which inclines downwardly from front to rear, has secured to it a plurality of cleats 31, the rearmost one of which engages behind a cleat 32 fixed to the floor 14 at the extreme rear end of the compartment 22 (see Fig. 1). This engagement of the cleats just mentioned prevents accidental endwise shifting of the tank in the compartment but permits of the ready removal when so desired by simply lifting the tank upwardly until the cleats are disengaged.

The tank 30 includes an upright longitudinally extending intermediate wall 33 which divides the tank into a wider compartment 34 and a narrower compartment 35, for holding respectively the paste and water used in posting. In the top wall of the tank are filler openings 36, one for the paste and one for the water compartment, the openings being closed by removable caps 37. Surrounding that part of the compartment 22 above the tank 30 is a railing 38 which together with the top of the tank provides a convenient place for the storage of the waste paper sheets removed from the bill boards or other surfaces to be posted. This railing holds the waste paper from being blown about, until a place of disposal is reached. Suitably mounted in the back wall of the tank near the inclined bottom wall are spigots 39, one for the water compartment and one for the paste compartment, by means of which water and paste may be withdrawn from the respective compartments.

Suspended from the floor 14 beneath the rear end of the tank 30 is a box 40, for the reception of the paste buckets used by the posters. This box, which is open at its rear, includes a front wall 41, side walls 42 and a slatted bottom wall 43, the open rear end of the box being normally closed by a door 44 hinged to swing downwardly. To the side margins of the door are secured strap eyes 45 through which extend brace bolts 46, said bolts also extending through swiveling eyes 47 secured to the side walls of the box. The ends of the bolts are headed and so engage the said strap eyes that when said door is in the open position shown in Fig. 5, they act as braces to hold said door in a horizontal position, forming a platform or continuation of the slatted bottom wall of the box. When said door is in this open position, it forms a convenient support for the paste and water buckets in filling them from the tank 30 and also provides a place to stand upon when filling the paste and water compartments of said tank. The free edge of the door and the top wall of the box have coacting fastening devices to hold the door in the closed position.

Beneath the foot board 20 is secured a longitudinally extending box 48 to receive the long handled paste brushes and scrapers used by the bill posters. The rear end of the box is made of a larger cross-sectional area than is the remainder of the box, for the head ends of the brushes, this end of the box having a hinged cover 49 which may be opened to remove or replace the brushes in said box. Suspended from the other foot board 19 is a battery box 50 to receive the electric storage battery of the motor vehicle to which the body is applied. Fixed to the foot board 19 and to the lefthand side wall 16 are coacting strap sections 51 which are adapted to be used as securing means for the extension ladders used by the posters and carried on the foot board 19.

My improved vehicle body has many advantages;—The bills or sheets to be posted on building walls, billboards and like places, are kept clean and dry within the compartment 25, access to which is had by swinging the seat-back 26ª downwardly. This permits easy and convenient sorting and arranging of the bill sections or sheets from within the cab.

The smaller compartment 22ª provides a convenient place for the carrying of the jacks and horses used in posting and the tank 30 in the larger compartment 22 may be easily removed from the body for the purpose of cleaning or repairing the same. The paste buckets are carried in the box 40, out of sight, and should they spill or slop over during transit, the spillage will fall through the slatted bottom of the box. The door of the bucket-box when open provides a support when filling the paste and water buckets from the tank. The brushes are carried in a place where they can not be seen by the casual observer, and from which they can not be lost or stolen, and the longer ladders are carried upon the foot boards in a manner preventing their being jostled or shaken therefrom.

My improved vehicle body is pleasing and neat in appearance and the arrangement of the various parts is such that an even distribution of the weight is attained upon the motor vehicle.

While in describing my invention I have referred to certain details of construction and arrangement of parts, I do not wish to be limited thereto except as may be pointed out in the appended claims.

I claim as my invention:—

1. A vehicle body comprising a body box having upright, longitudinally extending walls, a cab at the front end of the body box having an upright rear wall, a crossboard in the body spaced from and parallel with the rear wall of the cab and dividing the body box into a front and a rear compartment, a top wall for the front compartment, which compartment opens into the cab, and a tank removably mounted in the rear compartment.

2. A vehicle body comprising a body box and a cab at the front end thereof, said cab having a rear wall and the body box having a floor, upright side walls and an upright intermediate wall parallel with and spaced nearer to one side wall than the other, and dividing the body into a wide and a narrow compartment, an upright cross-board in the wider compartment near the rear wall of the cab, and a top board defining with the rear wall of the cab a third compartment which opens into the cab, and a combination paste and water tank removably mounted in the remainder of the wider compartment.

3. A vehicle body comprising a body box and a cab at the front end thereof, said cab having a rear wall and the body box having a floor, upright side walls and an upright intermediate wall parallel with and spaced nearer to one side wall than the other, and dividing the body into a wide and a narrow compartment, an upright cross board in the wider compartment near the rear wall of the cab, and a top board defining with the rear wall of the cab a third compartment which opens into the cab, a cleat fixed to the floor at the rear end of the wider compartment, a combination paste and water tank removably mounted in the wider compartment back of the third compartment, said tank having an inclined bottom wall, and cleats on the bottom wall of the tank, one of which cleats engages in front of the cleat on the floor to prevent endwise shifting of the tank.

4. A vehicle body comprising a body box and a cab at the front end thereof, said cab having a rear wall and the body box having a floor, upright side walls and an upright intermediate wall parallel with and spaced nearer to one side wall than the other, and dividing the body into a wide and a narrow compartment, an upright cross board in the wider compartment near the rear wall of the cab, and a top board defining with the rear wall of the cab a third compartment which opens into the cab, a tank removably arranged in the wider compartment back of the third compartment, foot boards extending along the side walls of the body box, and coacting strap members fixed to one of the foot boards and its associated side wall, by means of which a ladder may be secured on the foot board.

5. A vehicle body comprising a body box and a cab at the front end thereof, said body box having a floor and upright side and intermediate walls which divide the body box into two longitudinal compartments, open at the rear ends, one of said compartments being adapted to receive a tank, foot boards extending along the sides of the body in the plane of the floor, and a brush box suspended from beneath one of said foot boards, said brush box having an opening therein which is closed by a door.

In testimony that I claim the foregoing as my invention, I affix my signature in the presence of witness this 1st day of Aug., A. D. 1921.

JAMES J. KELLY.

Witness:
T. H. ALFREDS.